July 23, 1974　　　M. H. ROBIN　　　3,825,637
INJECTION MOLDING OF FOAM CORED SANDWICH STRUCTURES
Filed May 3, 1971　　　　　　　　　　　　3 Sheets-Sheet 3

United States Patent Office 3,825,637
Patented July 23, 1974

3,825,637
INJECTION MOLDING OF FOAM CORED
SANDWICH STRUCTURES
Maurice Henry Robin, Alderley Edge, England, assignor to Imperial Chemical Industries Limited, London, England
Continuation-in-part of application Ser. No. 93,917, Nov. 30, 1970, now Patent No. 3,767,742, which is a continuation of abandoned application Ser. No. 747,328, July 24, 1968. This application May 3, 1971, Ser. No. 139,776
Claims priority, application Great Britain, July 26, 1967, 34,400/67; Apr. 30, 1968, 20,470/68
The portion of the term of the patent subsequent to Oct. 23, 1990, has been disclaimed
Int. Cl. B29d 9/00, 27/00; B32b 7/02
U.S. Cl. 264—55
11 Claims

ABSTRACT OF THE DISCLOSURE

Injection molded solid skinned foam core sandwich structures are made using an enlargeable mold. During the molding operation, thin, non-foamed portions, such as hinges, or areas which can subsequently be removed to provide orifices in the molding, are made after the mold cavity has been filled with the foamable composition by effecting relative movement between a tool defining the non-foamed portion and one of the opposed surfaces of the mold.

---

Figure 1:
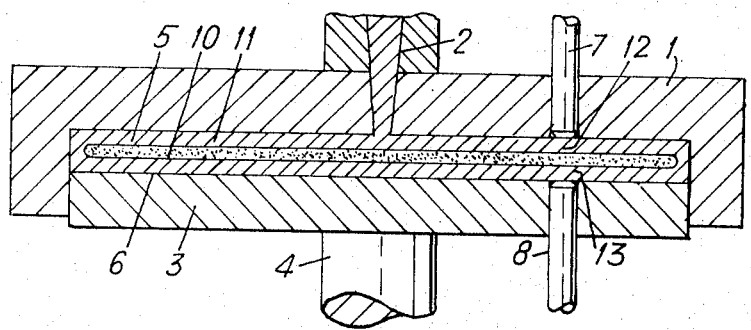

This application is a continuation-in-part application of my application Ser. No. 93,917 filed Nov. 30, 1970 and now U.S. Pat. 3,767,742 which in turn was a continuation application of my application Ser. No. 747,328 filed July 24, 1968, now abandoned.

This invention relates to the manufacture of articles from a plastics material such as thermosetting or, preferably, thermoplastic resins having a foam core enclosed by a non-foamed surface skin. In such articles it is often desired to provide an area of thinner cross-section that does not have a foamed core. For example it may be desired to make a hinge between adjacent areas each having the foam cored structure and this hinge is desirably of a non-foamed core structure. Alternatively it may be desired to form thin non-foam cored areas surrounded by foam cored areas. Such non-foam cored areas may be removed subsequent to manufacture to provide orifices in the foam cored article or to separate a foam cored article into smaller articles. Desirably such articles are made by injection molding.

Accordingly, I provide a process for the manufacture of articles having at least one portion having a core of a foamed plastics composition integrally formed with solid surface layers of a non-foamed plastics composition and at least one portion adjacent thereto comprising substantially non-foamed material and being of thinner cross-section than said adjacent foam cored portion, comprising:

injecting a non-foamable injection moldable plastics composition into a mold cavity provided with a pair of opposed mold surfaces against which the desired non-foamed surface layers are to be molded;
subsequently, but before the central portion of the non-foamable plastics material has set, injecting a foamable injection moldable plastics composition containing a blowing agent and a plastics material into the non-foamable plastics composition to substantially fill the mold cavity, said foamable composition being at a temperature above the activation temperature of the blowing agent therein and the pressure on the foamable composition within the mold cavity being such that foaming is substantially prevented,
subsequently enlarging the volume of the mold cavity by causing a predetermined amount of relative movement between said opposed mold surfaces to allow the substantially unfoamed foamable composition containing the blowing agent within the non-foamable composition to foam,
maintaining the plastics composition within the enlarged mold cavity for sufficient time to allow the plastics compositions to set, and
after filling the mold cavity but before the plastics compositions therein have set, effecting relative movement between a tool, positioned to define the desired thinner non-foamed portion, and one of said opposed mold surfaces in such a direction so as to decrease the ratio of the distance between said tool and the other of said opposed mold surfaces to the distance between said two opposed mold surfaces, thereby causing said thinner non-foamed portion to be formed.

The charges of non-foamable and foamable compositions may be introduced into the mold by a variety of methods. One method uses a conventional injection molding machine in which a predetermined amount of the non-foamable composition is introduced into the front of the barrel of the injection molding machine and the foamable composition introduced into the barrel behind the non-foamable composition. This method, however, suffers from the disadvantage that, if the process is operated repetitively, which is desirable, the second and subsequent shots of non-foamable composition are being introduced into a region of the barrel of the machine which already contains some of the foamable composition and so mixing of the two is liable to occur.

One method of overcoming this disadvantage is by injecting a further small quantity of non-foamable composition into the mold cavity after injecting the foamable composition. In this way the front of the barrel and the nozzle can be swept clean of the foamable composition at the end of the injection stroke so that non-foamable material free from contaminating foamable composition is left in the front of the barrel and nozzle for injection in the next molding cycle.

A more convenient, and preferred method, is to use two injection barrels, both of which feed material into an injection nozzle which itself injects material into the mold. The operation of the machine is synchronised so that the required quantity of non-foamable composition is first introduced into the mold and then the required amount of the foamable composition is injected into the mold thereby emptying the nozzle so that a further quantity of non-foamable composition may be introduced into the mold in the next molding cycle without it mixing with any of the foamable composition. Again the system can be programmed if desired to inject a small amount of non-foamable composition at the end of the injection stroke to sweep the nozzle clear of the foamable composition. Alternatively, two injection molding machines may be used, each of which injects material through separate nozzles into the mold, the timing of the operation of the machines being correlated so that the desired amount of non-foamable composition is first introduced into the mold and is then followed by the desired amount of the foamable composition. In some cases, the system may be programmed to advantage so that some foamable composition may be injected before all the non-foamable composition has been injected.

In the process of the invention, after introducing the charges of non-foamable and foamable compositions, opposed mold surfaces are moved away from each other so as to enlarge the mold cavity to permit the foamable composition to foam. The enlargement may be effected by instantaneously relieving the pressure holding the opposed surfaces of the mold together so that the pressure generated by the decomposition of the blowing agent forces the opposed surfaces of the mold apart and thus allows foamable composition to foam and expand to fill the enlarged mold cavity. Alternatively, the pressure holding opposed surfaces of the mold may be reduced slowly thereby allowing a controlled expansion of the mold. The expansion of the mold may be effected entirely by the pressure created by the decomposition of the blowing agent, or alternatively, external forces may be applied to assist enlargement of the mold cavity.

The surface of the molds used in the present invention may be textured to impart any desired surface to the molded article. For example, the mold surface may be smooth, grained, matt, or have a regular pattern thereon, so as to impart a corresponding surface finish to the non-foamed skin of the article. Alternatively the mold may be coated with a high temperature resistant material, for example, silicone rubber, to impart a desired surface finish.

When using the process of the present invention the tendency for voids or sink marks to be formed in the surface of the article is reduced. An additional advantage is that the presence of the blowing agent in the core of the molding creates a pressure which urges the plastic compositions to fill the mold. This counteracts the tendency of the materials to shrink as they cool down in the mold which is a disadvantage when molding solid moldings as it leads to the material shrinking away from the mold walls which results in surface imperfections in the molding. Furthermore, there is the added advantage that if pigments, fillers or other additives which improve the surface finish of the article are to be included in the molding they need only be included in the non-foamable composition. This may result in considerable financial saving as smaller amounts of these additives or compositions containing them may be used and many of these additives are expensive. Examples of fillers which may be included to improve the stiffness of the molding include glass and asbestos fibres or glass and mica plates optionally coated with a resin to improve adhesion between the filler and the plastics material. If desired, different additives may be included in the foamable and non-foamable compositions.

The amount of non-foamable composition that is injected into the mold will depend upon the size of the mold and the required thickness of the unfoamed surface skin.

The successful attainment of mold filling during the process set out above is dependent only on the physical properties of the plastics compositions and the particular chemical natures of the compositions are unimportant to the process steps. Hence, any thermoplastic resin or thermosetting resin which may be injection molded may be used in the process as the non-foamable composition or the foamable composition, since any thermoplastic or thermosetting resin composition which is essentially stable at elevated temperatures sufficient to make the composition flowable may be injection molded. The term injection moldable plastics composition is defined herein as any plastics composition which is essentially heat stable at temperatures sufficient to render the composition flowable and hence injection moldable. Examples of suitable injection moldable thermoplastic resins which may be incorporated in the non-foamable or foamable compositions include polymers and copolymers of α-olefines, such as high and low density polyethylene, polypropylene, polybutene, poly-4-methyl pentene-1, propylene/ethylene copolymers, copolymers of 4-methyl pentene-1 with linear-α-olefines containing 4 to 18 carbon atoms, and ethylene/vinyl acetate copolymers; polymers and copolymers of vinyl chloride, vinyl acetate, vinyl butyral, styrene, substituted styrenes such as α-methyl styrene, acrylonitrile, butadiene methyl methacrylate, vinylidene chloride. Specific examples of such polymers include vinyl chloride homopolymers and copolymers of vinyl chloride with vinyl acetate, propylene, ethylene, vinylidene chloride, alkyl acrylates such as 2-ethyl hexyl acrylate, alkyl fumarates, alkyl vinyl ethers, such as cetyl vinyl ether, and N-aryl maleimides such as N-o-chlorophenyl maleimide; polyvinyl acetate, polyvinyl butyral; polystyrene, styrene/acrylonitrile copolymers; polyacrylonitrile; copolymers of butadiene with methyl methacrylate and/or styrene and optionally acrylonitrile; polymethyl methacrylate; copolymers of methyl methacrylate with minor amounts of alkyl acrylates such as methyl acrylate, ethyl acrylate and butyl acrylate; copolymers of methyl methacrylate, N-aryl maleimides and optionally styrene; and vinylidene chloride/acrylonitrile copolymers; melt processable copolymers of tetrafluoroethylene and hexafluoropropylene. Halogenated polymers or copolymers may be used; for example halogenated α-olefine polymers, such as chlorinated polyethylene, or halogenated vinyl chloride polymers, such as chlorinated polyvinyl chloride.

Injection moldable compositions containing cross-linked or cross-linkable thermoplastic materials may be utilised; for example copolymers of methyl methacrylate with glycol dimethacrylate.

Other injection moldable thermoplastic polymers that may be used include condensation polymers such as the injection molding grades of linear polyesters such as polyethylene terephthalate; polyamides such as polycaprolactam, polyhexamethylene adipamide and copolyamides such as copolymers of hexamethylene diamine adipate and hexamethylene diamine isophthalate, particularly those containing from 5 to 15% by weight of hexamethylene diamine isophthalate; polysulphones and copolysulphones; polyphenylene oxides; polycarbonates; thermoplastic polymers and copolymers of formaldehyde; thermoplastic linear polyurethanes; and the thermoplastic derivatives of cellulose such as cellulose acetate, cellulose nitrate and cellulose butyrate and mixed cellulose esters for example cellulose acetate butyrate. Where a copolymer is used, the amounts of the comonomers that are used in the various copolymers will depend, inter alia, on the properties required of the moulding.

Examples of suitable thermosetting resins that may be used include phenol-aldehyde resins, amine-formaldehyde resins, epoxy resins, polyester resins, thermosetting polyurethanes, and vulcanisable rubbers. The resins may contain a hardening agent or catalyst where this is necessary to enable the resin to set.

Blends of these plastics materials may also be used in the foamable or non-foamable compositions. The choice of the resin will depend upon the use to which the article is to be put, for example, if a stiff panel is required to form part of the body of a motor car then a stiff outer skin is required and polypropylene is a suitable resin. However, if a flexible molding is required, for example, for the interior trim of a motor car, then a plasticised vinyl chloride polymer will be eminently suitable as the non-foamable thermoplastic resin.

The plastics material or materials in the foamable composition may be the same as, or different from the plastics material or materials in the non-foamable composition. Thus the foamable composition may be the same as the non-foamable composition except for the addition of blowing agent. Alternatively, while the plastics materials in the foamable and non-foamable compositions may be identical, other ingredients, apart from the use of blowing agent in the foamable composition, may vary between the foamable and non-foamable compositions. Thus, as mentioned above, if desired, fillers or pigments may be incorporated in the non-foamable composition that are not present in the foamable composition.

Also plastics materials that are different but of similar chemical nature may be utilised. Thus the foamable composition may, for example, comprise a plastics material of similar chemical nature but different physical properties, e.g. different molecular weight, to that in the non-foamable composition.

Alternatively the plastics materials may be chemically different: for example a polypropylene composition may be used for one composition while a propylene/ethylene copolymer is used in the other composition; alternatively the plastics materials can also be quite distinct chemically: thus, for example, a methyl methacrylate copolymer may be used in one composition while a vinyl chloride copolymer is used in the other composition. However some combinations of plastics materials may not give a sufficiently strong bond between the non-foamed skin and foamed core. Simple trials will indicate whether any particular combination gives a satisfactory bond.

The blowing agents which may be used in the foamable composition may be solids which decompose on heating to yield a gas which effects foaming, liquids which vaporise on heating or on the reduction of the pressure to effect foaming, or may be gaseous. Where a liquid is used, it is preferably an organic liquid which is inert to and may be absorbed by the plastics material of the foamable composition. The gas liberated by the solid type of blowing agent should preferably be inert to the plastics material. By the "activation temperature of the blowing agent" I mean that the temperature of the foamable composition as it leaves the injection nozzle is sufficiently high for the composition to foam within the mold when the pressure on the foamable composition is reduced. This temperature is determined by the nature of the blowing agent; for example if the blowing agent is a solid that liberates a gas on heating, the temperature of the foamable composition as it leaves the nozzle should be above the temperature at which the gas is liberated. If, however, the blowing agent is a liquid which vaporises on heating, the conditions under which the gas is liberated will depend on both the temperature of the foamable composition and the pressure to which it is subjected; in this situation the temperature of the composition as it leaves the nozzle should be sufficiently high that the gas will be formed when the pressure on the foamable composition in the mold cavity is relieved by the enlargement of the mold cavity. The foamable composition may be brought to this temperature either by heating it to the required temperature as it passes along the barrel of the injection molding machine, although the pressure inside the barrel should be sufficiently high to prevent foaming, or by maintaining the temperature of the composition in the barrel below the activation temperature and relying on dynamic heating of the composition as it is injected into the non-foamable composition through the nozzle to raise it to the activation temperature. This second method is my preferred method. Examples of suitable liquid blowing agents include hydrocarbons such as pentane and the halo- and polyhalohydrocarbons; examples of suitable solid blowing agents include the nitrogen liberating blowing agents, for example the azo and hydrazo compounds, and also the carbon dioxide liberating blowing agents for example carbonates and bicarbonates. Examples of gases which may be used as blowing agents include nitrogen and carbon dioxide. In some instances it may be necessary to include a nucleating agent in the foamable composition to provide sites for bubble formation.

The non-foamed portion adjacent the foam cored structure is formed by effecting controlled relative movement between a tool defining the desired non-foamed portion and one of the opposed mold surfaces in such a direction as to decrease the ratio of the distance between tool and the other of said opposed surfaces to the distance between the two opposed mold surfaces.

For example the tool, which is preferably maintained at a temperature below the activation temperature of the blowing agent, may be forced against the non-foamed surface layers formed against the opposed mold surfaces while the foamable composition forming a core between the non-foamed surface layers is permitted to foam in the regions adjacent the tool, so that foaming over the area of the non-foamed portion is substantially prevented.

Another method is to arrange the tool so that it remains at a constant distance from one of the opposed mold surfaces, the relative movement between the tool and said one opposed mold surface being effected by the predetermined movement of the opposed mold surfaces away from each other.

Another method of forming the non-foamed portion, which is applicable when using thermoplastic compositions, is by using a tool defining the desired non-foamed portion, heated to a temperature above the softening point of the foamable composition, which is forced against the molding after foaming has taken place so as to compress and fuse the foamed core of the molding over the area of the desired non-foamed portion. In this case therefore, relative movement of the tool and one of the opposed mold surfaces takes place to compress and fuse the foam core of the molding between the tool and the other of the opposed mold surfaces.

In yet another method of forming the non-foamed portion, a piece of thin non-foamed material is held between a tool defining the desired non-foamed portion and one of the opposed mold surfaces so that portions of said material extend on either side of the tool so that the portions of the material become embedded in the foam cored member formed on either side of said tool, leaving a middle portion of the thin non-foamed material as the desired non-foamed portion.

Where this method is adopted to make a hinge between adjacent foam cored portions the non-foamed material should be flexible.

Suitable non-foamed materials include textile fabric and thin, flexible, sheets or films of a thermoplastic polymeric material. If a sheet or film of a thermoplastic polymeric material is used as the non-foamed material and a thermoplastic polymeric material is used to make the foam cored portions, then the thermoplastic polymeric materials may be the same or different.

As mentioned hereinbefore, the non-foamed portion may form a hinge between adjacent foam cored members. Such hinges may be formed in blanks from which hollow articles may be formed by folding the blank along integrally formed hinges.

In the production of such blanks, film or sheet flaps may be molded into the blanks in such positions that, when the blanks are shaped into hollow articles, they may be used to seal the foam cored members of the blanks together where the members are not connected by hinges. Conveniently, the flaps may be coated with an adhesive and the seal effected by heat-sealing.

Another application of the process of the present invention is in the production of thin non-foamed portions totally surrounded by the foam cored members. Such thin non-foamed portions may be removed subsequent to molding to give rise to orifices in the molding.

Normally, in injection molding processes, in order to make holes or thin areas in the molded article, pins or other projections are formed in the mold and, during the injection step, the molten material being molded, on meeting such an obstacle, is divided and flows round the obstacle and then the separate streams of the molten material rejoin.

However, when molding foam cored sandwich structures using an enlargeable cavity, the division and rejoining of, the molten non-foamable material around the obstacle gives rise to a "rib" of non-foamable material extending from the obstacle on the side of the obstacle remote from the point of injection. Such a rib is often undesirable as it may give rise to markings in the surface of the molding.

Such ribs may be avoided if the non-foamed portion is made by forcing a tool defining the desired non-foamed portion against the surface of the non-foamable plastics material, after filling the mold cavity but before the foamable plastics material and the inside of the layers of non-foamable plastics material have set, so as to compress together opposed portions of the non-foamable layers on either side of the charge of foamable plastics material over the area of the desired non-foamed portion. If the tool is forced against the surface of the non-foamed plastics material after enlargement of the mold cavity, the foam structure is destroyed. Preferably the tool is forced against the surface of the non-foamable plastics material before enlargement of the mold cavity. Preferably the foamable plastics material between the opposed non-foamed surface layers is forced from between said opposed portions on compression of the surface layers, so that the non-foamed surface layers are fused together over the area of the desired non-foamed portion.

While the tool preferably has a flat end which is pressed against the surface of the non-foamable plastics material, it is also preferred that the perimeter of the end is chamfered to minimise tearing of the surface of the non-foamable plastics material.

It will be appreciated that, where the foamable material is forced from between the opposed layers of non-foamable plastics material, the maximum thickness of the non-foamed portion obtained in the molded article is limited to the sum of the thicknesses of the non-foamed surface layers. The thickness of the non-foamed portion may well be less than the sum of the thicknesses of the non-foamed surface layers as the tool may, of course, force part of the unset non-foamable plastics material from between the opposed surface layers. While it is generally not practical to force all the non-foamable plastics material from between the tool and the opposed mold surface between which the portions of the non-foamable layer is compressed, for example when an orifice is desired in the molding, the thickness of the non-foamed portion remaining in the molded article may be relatively small, preferably less than 0.2 mm. and particularly of the order of 0.05 mm., and so can easily be removed, if desired, to form an orifice.

Where the formation of an orifice is desired by providing a thin layer of non-foamed material which is subsequently removed, then the tool may take the form of a ring in the shape of the desired orifice which compresses the opposed non-foamable layers round the periphery of the desired orifice.

The tool may take the form of a pin or, as mentioned above when an orifice is desired, a ring which is forced towards the opposed surface of the mold cavity. Alternatively, a tool member may be provided in each of the opposed surfaces of the mold cavity and the two tool members are forced towards each other into the mold cavity. In this way the non-foamed portion can be formed in mid thickness of the foam cored structure and not adjacent to one surface thereof. In many cases this is to be desired; particularly where the non-foamed portion is to be removed to form an orifice, so that any flash remaining after removal of the non-foamed portion does not show on the surface of the molded article.

Figure 2:
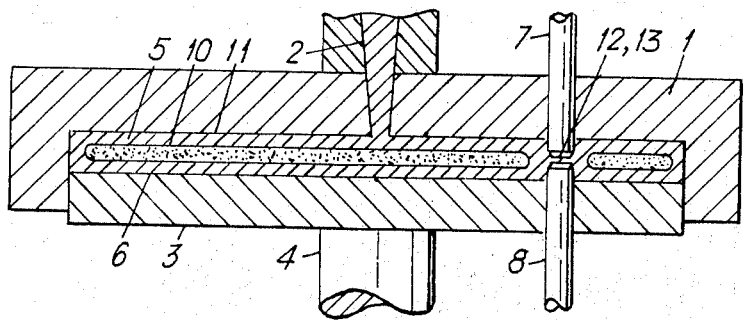
Figure 3:
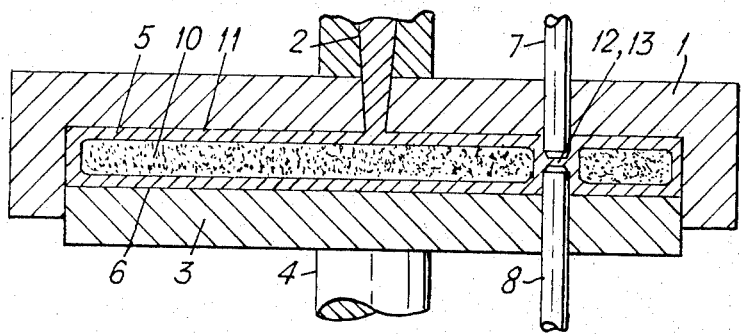
Figure 4:
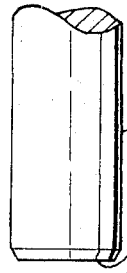
Figure 5:
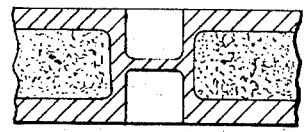
Figure 6:
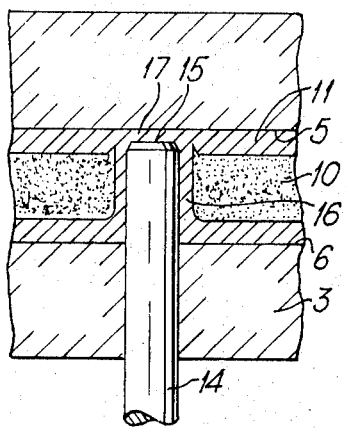
Figure 7:
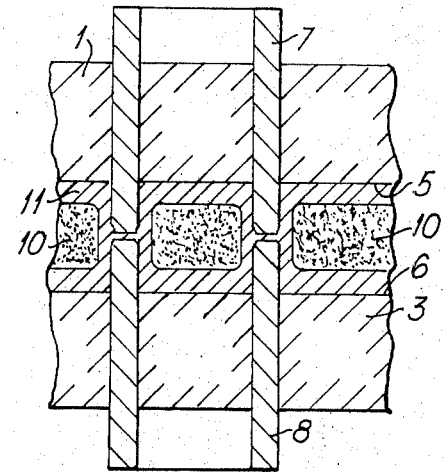
Figure 8:
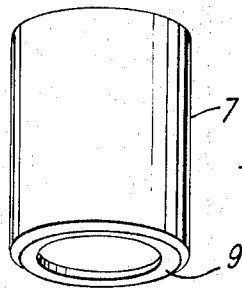
Figure 9:
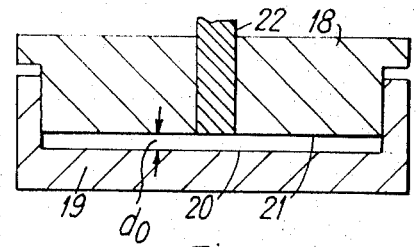
Figure 10:
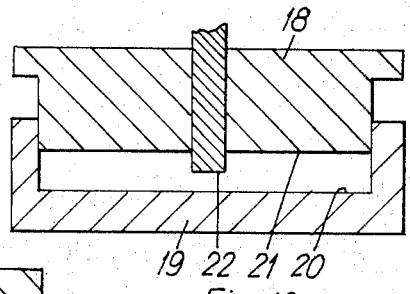

The invention is illustrated with reference to the accompanying drawings wherein FIG. 1 is a cross section of part of an injection molding machine showing a filled mold cavity before enlargement and before compression of the non-foamed surface layers, wherein the tool forming the non-foamed portion consists of two moveable members, FIG. 2 is a view similar to FIG. 1 but after compression of the non-foamed surface layers, FIG. 3 is a view similar to FIGS. 1 and 2 but after enlargement of the mold cavity, FIG. 4 is an elevation of one member of the tool used for compressing the non-foamed surface layers to a thin sheet of non-foamed material in FIGS. 1 to 3, FIG. 5 is an enlarged cross section of part of the article formed by the apparatus depicted in FIGS. 1 to 4, FIG. 6 is an enlarged view similiar to part of FIG. 3 showing the formation of the layer of non-foamed material by a single tool, FIG. 7 is a view similar to FIG. 6 showing the use of a tool system consisting of two hollow tools for the formation of a thin ring of non-foamed material, FIG. 8 is a perspective view of one component of the tool system used in FIG. 7, FIG. 9 is a cross-section of an enlargeable mold with a fixed tool defining the desired non-foamed portion, FIG. 10 is a cross section of the mold of FIG. 9 after enlargement of the mold cavity.

Figure 11:
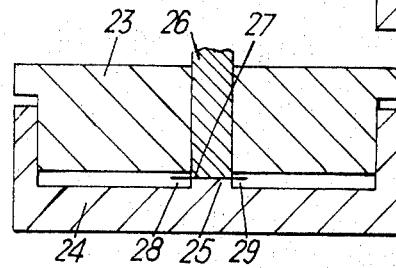
Figure 12:
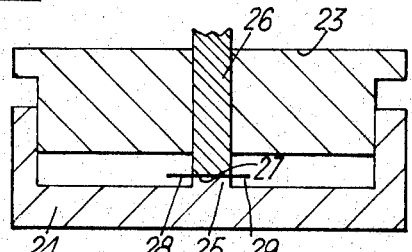
Figure 13:
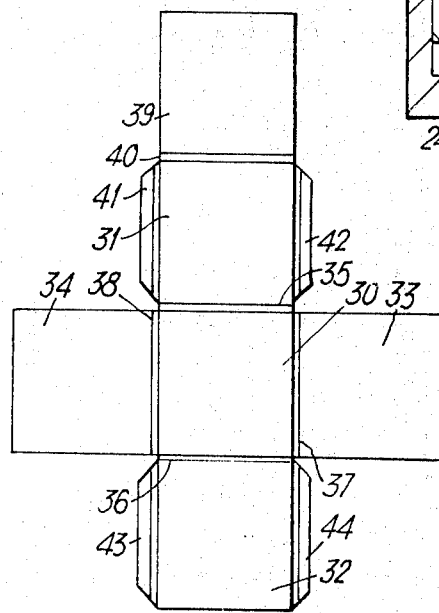

FIGS. 11 and 12 are cross sections of an enlargeable mold, before and after enlargement thereof respectively, having a tool defining the desired non-foamed portion in the form of a clamp for a hinge of plastic film, and FIG. 13 is a plan view of a blank formed by the process of the invention.

In FIGS. 1 to 3 there is shown part of an injection molding machine having a mold cavity defined by a fixed mold member 1, through which the plastics materials may be injected via a nozzle 2, and a moveable mold member 3. Mold member 3 is held in position with respect to mold member 1 by means of a hydraulic ram 4 acting, in conventional manner, against a backing plate (not shown) connected to the fixed mold member 1 by tie bars (not shown). The opposed surfaces 5, 6 of the mold members 1 and 3 respectively are thus relatively moveable, retraction of mold member 3 enlarging the mold cavity by increasing the distance between surfaces 5 and 6.

In each of mold members 1 and 3 a cylindrical tool, indicated by numerals 7 and 8 respectively, is located at the position where an area of non-foamed material is desired with the ends 9 thereof flush with the surfaces 5, 6 of the mold cavity so that no obstructions protrude into the mold cavity to impede the filling thereof. The ends 9 of these tools are chamfered as depicted in FIG. 4. These tools 7 and 8 are each hydraulically operable to bring their ends 9 closer together.

In operation, the molding cycle is as follows:

Firstly, a charge of a melt of a non-foamable plastics material composition is injected into the mold cavity via nozzle 2. Subsequently, a charge of a melt of a plastics material containing a blowing agent is injected under pressure into the charge of non-foamable plastics material also via nozzle 2 at a temperature above the activation temperature of the blowing agent i.e. at a temperature at which the plastics material would foam if it were not constrained under pressure. A third charge, consisting of a small amount of the non-foamable composition is then injected so as to totally enclose the foamable composition and to clear the nozzle 2 of any foamable composition so that, when injecting, the first charge in the next molding cycle, only non-foamable material is injected into the mold cavity. [While this step is preferred, it is not essential.]

At this stage the system is as shown in FIG. 1, with the foamable plastics material 10 forming a core surrounded by a layer 11 of the non-foamable plastics material. Before the interior surface of the layer 11 of non-foamable plastics material has set, tools 7 and 8 are forced together thereby squeezing opposed portions 12, 13 of layer 11 together thus forcing the foamable plastics material 10 from between these portions 12 and 13 so that the two portions 12 and 13 contact each other and fuse together as shown in FIG. 2 to form a thin layer of non-foamable material in approximately the mid thickness of the mold cavity.

The mold cavity is then enlarged by retracting mold member 3, for example by reducing the hydraulic pressure acting on ram 4. This permits the foamable plastics material to foam. Preferably the tool components 7 and 8, while being maintained with their ends 9 close together, are moved bodily in the same direction as, and at the same time as, the movement of mold member 3 so that the fused portions 12 and 13 of layer 11 remain in approximately mid thickness of the mold cavity as it is enlarged as shown in FIG. 3. In this way stretching and consequent thinning of the portions of layer 11 immediately adjacent to the fused portions 12, 13 is symmetrical. Where the degree of enlargement of the mold cavity is relatively small the degree of asymmetry of the stretching will be small and can generally be ignored.

If the plastics materials are thermoplastic resin compositions the molding is then allowed to cool to solidify the thermoplastic compositions so that, on removal of the molded article, part of which is shown in FIG. 5, from the mold no further expansion occurs. If the plastics materials are thermosetting resins, the plastics materials are maintained in the heated condition until set. The molded article thus formed consists of an area having a solid unfoamed skin and a foam core surrounding a thin area of non-foamed material. If desired this area of non-foamed material may be removed after the molded article has been removed from the mold cavity so as to provide a foam cored sandwich structure with an orifice therein, with the sides of the orifice, like the rest of the article, having a non-foamed skin.

An alternative tool for forming the thin layer of non-foamed material is shown in FIG. 6. Here a single cylindrical tool 14 is mounted in mold member 3, and before the mold cavity is filled, has its end 15 flush with surface 6 of the mold cavity so that no obstructions protrude into the mold cavity to impede the filling thereof. To form the area of non-foamed material, the end 15, of tool 14 is forced towards surface 5 of mold member 1 thus pressing a portion 16 of the layer 11 of non-foamable material adjacent to mold surface 6 towards a portion 17 of the layer 11 of non-foamable material adjacent to mold surface 5. In FIG. 6 the system is shown after enlargement of the mold cavity. This tool arrangement has the advantage that only one moveable tool, i.e. tool 14, is required and this does not have to move relative to mold member 1 on enlargement of the mold cavity.

It will be appreciated that this arrangement can readily be inverted to give a tool slidably mounted in the fixed mold member 1 which presses a portion of the layer of non-foamable material adjacent to the mold surface of mold member 1 towards the surface of the moveable mold member 3. In this case, however, the tool would have to be held in fixed relationship to mold member 3 upon enlargement of the mold cavity by retraction of mold member 3.

In FIG. 7 a modification of the tool system of FIGS. 1 to 3 is shown. Here the tools 7 and 8 each take the form of a hollow ring (one of which is shown in FIG. 8). Both the inside and outside edges of the end 9 of the rings are chamfered. In use the system operates as described above in relation to FIGS. 1 to 3. The material inside the rings 7 and 8 foams on enlargement of the mold leaving a narrow ring of non-foamed material in the molded article.

The central portion of the foam cored sandwich structure enclosed by this narrow ring can be punched out after molding to give an orifice.

In FIGS. 9 and 10 there is shown a system suitable for the formation of a hinge.

In FIG. 9 a mold is shown consisting of the mold components 18 and 19 slidably mounted with respect to each other defining an enlargeable mold cavity having surfaces 20, 21 against which it is desired to form nonfoamed surface layers. A tool 22, defining the desired non-foamed portion, in the form of a bar extending across the width of the mold cavity, so as to give a hinge in the molded article, is slidably mounted in mold component 18 but is held in fixed spatial relationship with mold component 19.

In operation, a non-foamable plastics material is first injected into the mold and forms the non-foamed surface layers against the mold surfaces 20 and 21. Before the central portion of this non-foamable composition has solidified, a foamable plastics material is injected to within the non-foamable plastics material at a temperature above the activation temperature of the blowing agent while mold component 18 is held in position relative to mold component 19 by hydraulic pressure sufficient to prevent foaming of the foamable material. The pressure holding mold component 18 in place is then relieved to permit component 18 to move away from mold component 19 thereby increasing the distance $d_0$ apart of surfaces 20 and 21. The enlarged mold is shown in FIG. 10. As the mold component 18 moves away from component 19, foaming of the foamable core takes place between the non-foamed surface layers formed against surfaces 20 and 21. However, as the tool 22 does not move relative to mold component 19, the distance $d$ between the end of the tool 22 and surface 20 remains constant and so foaming in the space between tool 22 and mold component 19 does not take place and so a thin flexible hinge is formed between the foam cored members formed on each side of the tool 22.

While in the arrangement described above the hinge defining tool 22 is fixed relative to mold component 19, it will be appreciated that the mold can be arranged, if desired, so that the tool 22 is moved relative to mold component 19 to give other hinge thicknesses.

Since the distance $d_0$ between surfaces 20 and 21 increases on enlargement of the mold cavity, the ratio of $d$ to $d_0$ is decreased.

In an alternative arrangement applicable when molding thermoplastic resins, tool 22 moves with mold component 18 on enlargement of the mold cavity and then, when foaming of the foamable material has occurred, tool 22, preferably heated to a temperature above the softening point of the foamable material, is forced towards surface 4 to the position shown in FIG. 10 so that the foam formed between the end of tool 22 and surface 20 is destroyed, fusing the plastics material in the foam material to a thin non-foamed mass so as to form a hinge between the foam cored members on either side of tool 22.

An alternative method of forming a hinge, is shown with reference to FIGS. 11 and 12 wherein an enlargeable mold cavity is formed by mold components 23, 24. The hinge defining tool, in the form of a projection 25, extending from mold component 24, and a bar 26 slidably mounted in mold component 23 clamps the middle portion 27 of a piece of fabric or plastic film in the mold cavity having the end portions 28, 29 of the piece of fabric or film extending into the mold cavity on either side of the hinge defining tool.

On formation of the foam cored members in the cavity on either side of the hinge defining tool the portions 28, 29 of the piece of film become embedded in the foam cored members. During enlargement of the mold cavity by movement of mold component 23 away from mold component 24, during which step foaming takes place, the bar 26 is held against the middle portion 27 of the piece of film so that none of the plastics materials injected into the mold is molded against this middle portion 27 of the piece of fabric or film.

In FIG. 13 there is shown an example of a blank molded from a foamable composition. This blank, which can be folded to form a box with a lid, has a base piece 30, four wall pieces 31, 32, 33 and 34 connected to the base piece 30 by integrally formed non-foamed hinges 35, 36, 37, 38 and a lid piece 39 connected to wall piece 31 by an integrally formed non-foamed hinge 40. Small foam cored members 41, 42 and 43, 44 are formed along the opposite sides of wall pieces 31 and 32 respectively as flaps which can be used for fastening the wall members 33, 34 to the wall members 31 and 32 in assembly of the box from the blank. Instead of these flaps 41, 42, 43 and 44 being foam cored members, they may be made non-foamed during the molding by preventing foaming over all the flap area instead of just along the hinge lines during the molding process.

Objects constructed in this manner from the blanks have the advantages of having a good strength to weight ratio and also the foam cores of the foam cored members provide insulating properties both to heat and cold and to sound.

Examples of hinged articles which may be made by the means of the present invention include book covers, tote bins, tea chests, fruit boxes, drawers, crates, tanks, for example, domestic water tanks, lavatory cisterns, sinks, cupboards, television and radio cabinets, letter boxes and a variety of other articles. Where a hollow object is constructed from a blank, the foam cored members may be assembled together in any suitable manner, although it will be appreciated that if containers for liquids are to be made, the joints between the edges of the foam cored members must be liquid tight. One convenient method of joining the foam cored members is by the use of heat sealable flaps, as mentioned above. Alternatively, or in addition, lugs may be formed in one foam cored member of the blank during the molding, the lugs being positioned so as to interlock with recesses formed in the foam cored member which is to form an adjacent wall of the object, or the sides of the article may be bound or sealed together with strapping tape.

If desired, the molds used may be shaped so as to provide ribs and bosses integrally molded in the article. Where the article is a foldable blank these will improve the stiffness and rigidity of objects formed from the blanks and also provide positions at which attachments such as hinges, catches and locks may be attached to the hollow object formed from the blank.

By the manufacture of hinged articles according to the present invention, articles such as blanks may be formed flat and so their surfaces can be treated, for example, embossed or printed, far more readily than in the case of a "three-dimensional" object. Thus blanks for the formation of cabinets can easily be printed with a wood grain finish. Another advantage resulting from the use of a foam cored structure is that a cabinet such as a radio or television cabinet made according to the invention has good acoustical properties.

Examples of non hinged articles having non-foamed portions or orifices, such as bolt holes, therein include panels, signs and containers such as baths and tanks.

I claim:

1. A process for the manufacture of an article having (I) at least one portion having (i) a core of a foamed thermoplastic polymeric composition integrally formed with solid (ii) surface layers of a non-foamed thermoplastic polymeric composition and (II) at least one portion adjacent thereto comprising substantially non-foamed thermoplastic composition and being of thinner cross section than said adjacent foam cored portion comprising:
   (a) injecting a non-foamable injection moldable thermoplastic polymeric composition into a mold cavity provided with a pair of opposed mold surfaces against which the desired non-foamed surface layers are to be molded,
   (b) and before the central portion of the non-foamable composition has set, injecting a foamable injection-moldable thermoplastic polymeric composition containing a blowing agent and a thermoplastic polymeric material into the non-foamable plastics composition to substantially fill the mold cavity, said foamable composition being at a temperature above the activation temperature of the blowing agent therein and the pressure on the foamable composition within the mold cavity being such that foaming is substantially prevented,
   (c) subsequently enlarging the volume of the mold cavity by causing a predetermined amount of relative movement between said opposed mold surfaces to allow the substantially unfoamed foamable composition containing the blowing agent within the non-foamable material to foam,
   (d) maintaining the thermoplastic compositions within the enlarged mold cavity for sufficient time to allow the thermoplastic compositions to set, and
   (e) after filling the mold cavity but before the thermoplastic compositions therein have set, effecting relative movement between a tool, positioned to define the desired thinner non-foamed portion, and one of said opposed mold surfaces in such a direction so as to decrease the ratio of the distance between said tool and the other of said opposed mold surfaces to the distance between said two opposed mold surfaces, thereby causing said thinner non-foamed portion to be formed.

2. A process as claimed in claim 1 in which, during the mold cavity enlargement step, the tool is forced against the non-foamed surface layers formed against the opposed mold surfaces whereby foaming over the area of the desired non-foamed portion is substantially prevented while the foamable core between the non-foamed surface layers is permitted to foam in the regions adjacent to said tool.

3. A process as claimed in claim 2 in which the tool is maintained at a temperature below the activation temperature of the blowing agent.

4. A process as claimed in claim 1 wherein the relative movement between the tool and said one opposed mold surface is effected by the predetermined movement of the opposed mold surfaces away from each other.

5. A process as claimed in claim 1 wherein after filling the mold cavity, but before the foamable plastics material and the inside of the layers of non-foamable plastics material have set, the tool is forced against the surface of the non-foamable plastics material over the desired area of unfoamed material, so as to compress together the non-foamable layers on either side of the charge of foamable plastics material over said area thereby forcing said foamable plastics material from between said opposed non-foamable layers and causing said opposed non-foamable layers to fuse together.

6. A process as claimed in claim 5 wherein the tool is forced against the surface of the non-foamable plastics material after the mold cavity has been filled but before enlargement thereof.

7. A process as claimed in claim 5 wherein a tool member is provided in each of the opposed surfaces of the mold cavity and the two tool members are forced towards each other into the mold cavity.

8. A process as claimed in claim 7 wherein the mold is formed by a fixed member and a moveable member and the tool is forced against the surface of the non-foamable plastics material after the mold cavity has been filled but before enlargement thereof, and after forcing the tool members against the surface of the non-foamable plastics material to compress the opposed portions of the non-foamable plastics material to a position in approximately mid-thickness of the mold cavity before enlargement thereof, moving both the two tool members in the same direction as, and at the same time as, the moveable member of the mold is moved to enlarge the mold cavity, while maintaining the opposed portions of the non-foamable layers compressed together, whereby the fused opposed portions of the non-foamable layers remain in approximately mid-thickness of the mold cavity as it is enlarged.

9. A process as claimed in claim 5 wherein the area of non-foamed material is removed after removing the molded article from the mold cavity so that an orifice is formed in the molded article.

10. A process as claimed in claim 9 wherein the tool is a ring which defines the periphery of the desired orifice.

11. A process as claimed in claim 1 wherein a third charge, consisting of a melt of a further quantity of the non-foamable plastics material, is injected after the foamable plastics material, and before enlargement of the mold cavity, so as to completely fill the mold cavity and enclosed the foamable plastics material with a layer of non-foamable material.

References Cited

UNITED STATES PATENTS

| | | | |
|---|---|---|---|
| 3,649,728 | 3/1972 | Honsho et al. | 264—48 |
| 3,599,290 | 8/1971 | Garner | 264—328 |
| 3,401,217 | 9/1968 | Burwell | 264—45 |
| 3,007,209 | 11/1961 | Roberts | 264—55 |
| 3,222,437 | 12/1965 | Schilling | 264—321 X |
| 3,531,553 | 9/1971 | Bodkins | 264—54 X |
| 2,996,764 | 8/1961 | Ross | 264—328 X |
| 3,378,612 | 4/1968 | Dietz | 264—54 X |
| 3,240,845 | 3/1966 | Voelker | 264—45 |
| 3,530,213 | 9/1970 | Belleisle | 264—321 X |
| 3,518,334 | 6/1970 | Carrigan | 264—321 X |

FOREIGN PATENTS

| | | |
|---|---|---|
| 1,176,813 | 1/1970 | Great Britain. |

HERBERT S. COCKERAM, Primary Examiner

U.S. Cl. X.R.

161—102, 161; 264—45, 54, 241, 378, DIG. 83